United States Patent
Pettine, Jr.

(10) Patent No.: US 7,336,950 B2
(45) Date of Patent: Feb. 26, 2008

(54) COMMUNICATION ADDRESS RE-DIRECTION SYSTEM FOR A MOBILE COMMUNICATION DEVICE

(75) Inventor: Richard Pettine, Jr., West Chester, PA (US)

(73) Assignee: Siemens Medical Solutions Health Services Corporation, Malvern, PA (US)

( * ) Notice: Subject to any disclaimer, the term of this patent is extended or adjusted under 35 U.S.C. 154(b) by 756 days.

(21) Appl. No.: 10/349,853

(22) Filed: Jan. 23, 2003

(65) Prior Publication Data

US 2004/0198354 A1 Oct. 7, 2004

Related U.S. Application Data

(60) Provisional application No. 60/422,560, filed on Oct. 31, 2002.

(51) Int. Cl.
*H04Q 7/20* (2006.01)
(52) U.S. Cl. ............... 455/435.1; 455/436; 455/417
(58) Field of Classification Search ............ 455/435.1, 455/466, 405–409, 433, 414.1, 411.2, 426.1, 455/428, 414.2, 404; 379/211.01, 211.02, 379/212.01, 21, 22, 23
See application file for complete search history.

(56) References Cited

U.S. PATENT DOCUMENTS

| | | | | |
|---|---|---|---|---|
| 5,617,471 | A * | 4/1997 | Rogers et al. | 379/212.01 |
| 5,673,308 | A | 9/1997 | Akhavan | 379/61 |
| 5,802,477 | A | 9/1998 | Mizokami et al. | 455/525 |
| 6,151,619 | A * | 11/2000 | Riddle | 709/204 |
| 6,233,325 | B1 * | 5/2001 | Frech et al. | 379/142.06 |
| 6,374,102 | B1 | 4/2002 | Brachman et al. | 455/422 |
| 6,564,049 | B1 * | 5/2003 | Dailey | 455/416 |
| 6,628,765 | B1 * | 9/2003 | Bangs et al. | 379/112.01 |
| 7,184,527 | B1 * | 2/2007 | Lin et al. | 379/93.17 |
| 2002/0002609 | A1 * | 1/2002 | Chung et al. | 709/223 |
| 2003/0023748 | A1 * | 1/2003 | Takemoto et al. | 709/238 |
| 2003/0200226 | A1 * | 10/2003 | Wells et al. | 707/104.1 |
| 2004/0198328 | A1 * | 10/2004 | Brandenberger | 455/414.1 |
| 2005/0130639 | A1 * | 6/2005 | Smith | 455/417 |
| 2005/0204030 | A1 * | 9/2005 | Koch et al. | 709/223 |

* cited by examiner

*Primary Examiner*—Duc M. Nguyen
*Assistant Examiner*—Justin Lee
(74) *Attorney, Agent, or Firm*—Alexander J. Burke

(57) ABSTRACT

A system and corresponding method supports voice communication using a mobile communication device employing a single user associated identification code in different relatively remote locations. A mobile communication device communicates a registration message to an access system at a first remote location using a wireless communication mode responsive to a user registration command via a displayed user interface image. The registration message includes a user associated identification code and security information. The registration message enables the access system to identify the user and to divert voice communication from a first telephone number, linked with a physical address of a second remote location that is associated with the user associated identification code, to the mobile communication device at the first remote location. The mobile communication device receives a response message indicating a status of the diversion of voice communication from the first telephone number linked with the physical address of the second remote location to the mobile communication device at the first remote location.

20 Claims, 8 Drawing Sheets

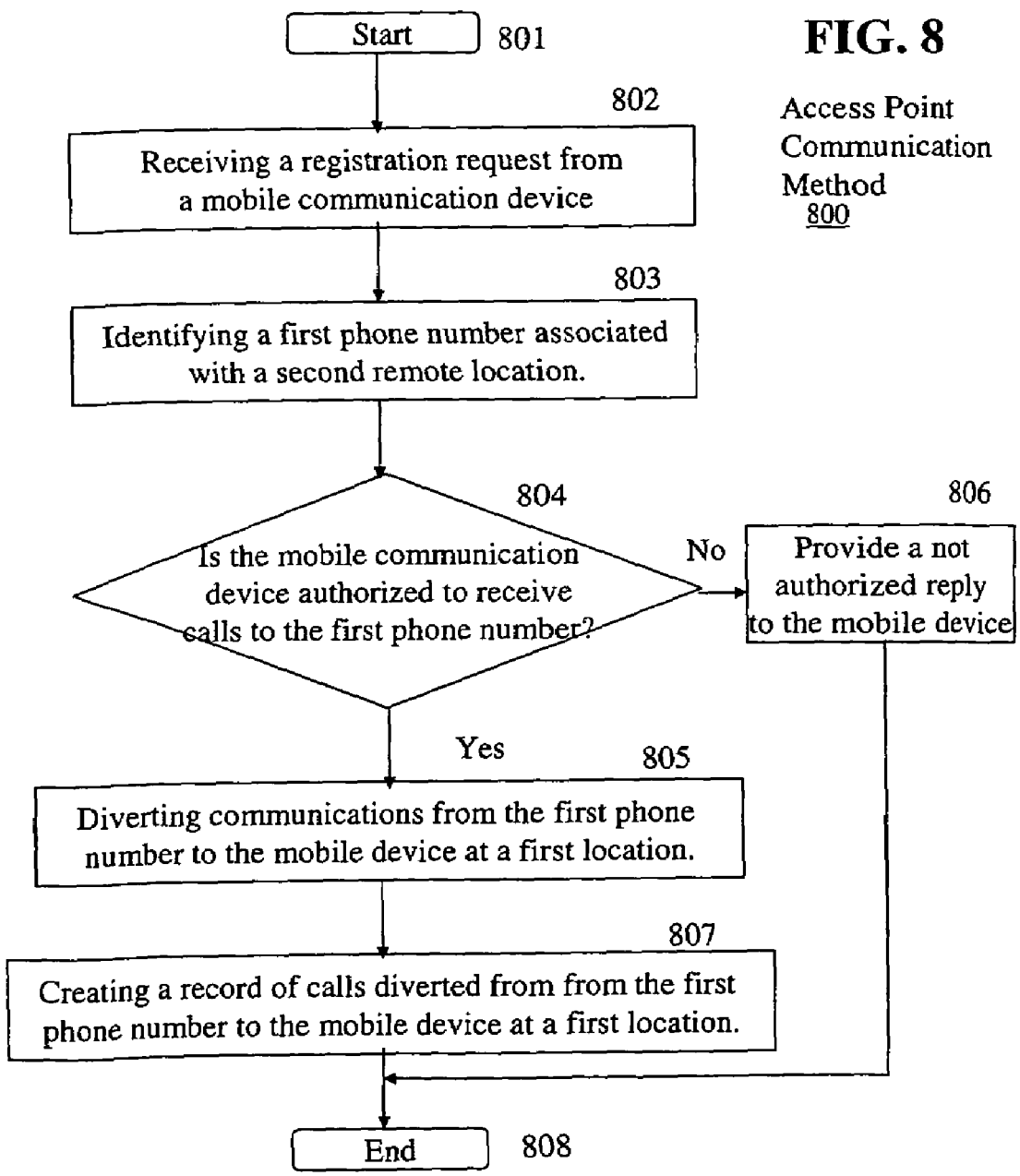

COMMUNICATION ADDRESS RE-DIRECTION SYSTEM FOR A MOBILE COMMUNICATION DEVICE

CROSS-REFERENCE TO RELATED APPLICATIONS

The present application claims priority to provisional application having Ser. No. 60/422,560 filed by Richard J. Pettine, Jr. on Oct. 31, 2002.

FIELD OF THE INVENTION

The present invention generally relates to communication systems. More particularly, the present invention relates to a system supporting communication address re-location for a mobile communication device.

BACKGROUND OF THE INVENTION

A cordless telephone system includes a base station and handset. The base station is connected to a phone jack using a standard phone wire connection. The phone jack is connected to a public switched telephone network (PSTN). The base station transmits a frequency modulated (FM) signal to the handset responsive to receiving a wire line signal from the PSTN. The base station transmits a wire line signal to the PSTN responsive to receiving a FM signal from the handset.

The handset generates an electrical signal responsive to receiving a FM signal from the base station. The electrical signal may represent an audio signal that drives a speaker or a data signal that drives a display. The handset generates an electrical signal such as when a user talks into a microphone or when the user presses a button on a keypad. The handset transmits a FM signal to the base station responsive to receiving an electrical signal generated in the handset. The base station and the handset operate on a FM frequency pair, called a duplex frequency, that permits the base station and the handset to send and receive FM signals at the same time, thereby permitting a user to talk and listen at the same time.

The cordless range of operation between the base station and the handset depends on engineering factors, including the power level and the frequency of the FM signals, as well as environmental effects, such as structures and landscape. Generally, the cordless range becomes longer as the power level and the frequency of the transmitted signal increases. Examples of cordless frequencies are 27 MHz, 43 to 50 MHz, and 900 MHz. Typically, the cordless range is between 20 m and 1.0 km.

Cordless telephones use digital signals to increase security thereby decreasing the chance for eavesdropping. A particular type of digital signal is digital spread spectrum (DSS). DSS technology enables information in a digital signal to be spread over several frequencies of the FM signal.

Mobile computers, such as a laptop computer, also access wire line networks, such as the PSTN, cable lines, and digital subscriber lines (DSL), over wireless communication links using a transceiver carried with the mobile computer. Typically, the transceiver and a small, integrated antenna, are built into an ISA, PCI, or PCMCIA card for connection to the mobile computer. Examples of wireless communication links includes Bluetooth®, Infrared Data Association (IrDA), HomeRF, otherwise known as Shared Wireless Access Protocol (SWAP), and Wireless Ethernet Capability Alliance (WECA), otherwise known as wireless fidelity (WI-FI).

Mobile communication devices, such as cordless telephones and mobile computers, that move or roam from one local area network (LAN) to the next may register with the closest local area network to access communications. Preferably, the LANs are in locations where a mobile communication device is expected to be, such as in employment related facilities. The registration procedure permits the mobile communication device to communicate with the LAN by assigning the mobile communication device's personal phone number to the remote LAN. The mobile communication device operates in the same way as when it is connected to its own home LAN. This type of roaming has elements known as personal phone number, a home location register, personal communication service (PCS). Therefore, a user moving among different LANs does not need to borrow a local telephone or mobile computer to access communications, and does not need to use a separate device, such as a cellular telephone to access communications. Further, the mobile communication device communicates over a wireless communication link using a personal phone number.

A healthcare provider, such as a hospital or a clinic, is one type of employment related facility that may have multiple LANs located in the same location or different locations. Various employees of the healthcare provider have a need to be mobile and yet engage in voice and/or data communications with the healthcare provider's communication systems. For example, a doctor may have a mobile communication device with healthcare specific software that needs to access a server device when the doctor moves among multiple related LANs. Presently, mobile communication devices lack integration of voice and/or data communications with the healthcare specific software in the mobile communication device for efficient healthcare related communications with a LAN.

It would be desirable to have a communication system that integrates voice and/or data communications with the healthcare specific software in the mobile communication device for efficient healthcare related communications with a LAN. Further, it would be desirable for the mobile communication device to have a graphical user interface that manages such integration. Such a system should be secure and easy to use. Accordingly, there is a need for a system supporting communication address re-location for a mobile communication device in a healthcare enterprise that overcomes the disadvantages of the conventional communication systems.

SUMMARY OF THE INVENTION

According to one aspect of the present invention, a system and corresponding method supports voice communication using a mobile communication device employing a single user associated identification code in different relatively remote locations. A mobile communication device communicates a registration message to an access system at a first remote location using a wireless communication mode responsive to a user registration command via a displayed user interface image. The registration message includes a user associated identification code and security information. The registration message enables the access system to identify the user and to divert voice communication from a first telephone number, linked with a physical address of a second remote location that is associated with the user associated identification code, to the mobile communication device at the first remote location. The mobile communication device receives a response message indicating a status of the diversion of voice communication from the first telephone number linked with the physical address of the second remote location to the mobile communication device at the first remote location.

These and other aspects of the present invention are further described with reference to the following detailed description and the accompanying figures, wherein the same reference numbers are assigned to the same features or elements illustrated in different figures. Note that the figures may not be drawn to scale. Further, there may be other embodiments of the present invention explicitly or implicitly described in the specification that are not specifically illustrated in the figures and visa versa.

BRIEF DESCRIPTION OF THE DRAWINGS

FIG. 8 illustrates a method for operating the access point, as shown in FIG. 1, in accordance with a preferred embodiment of the present invention.

DETAILED DESCRIPTION OF THE PREFERRED EMBODIMENTS

Figure 1:
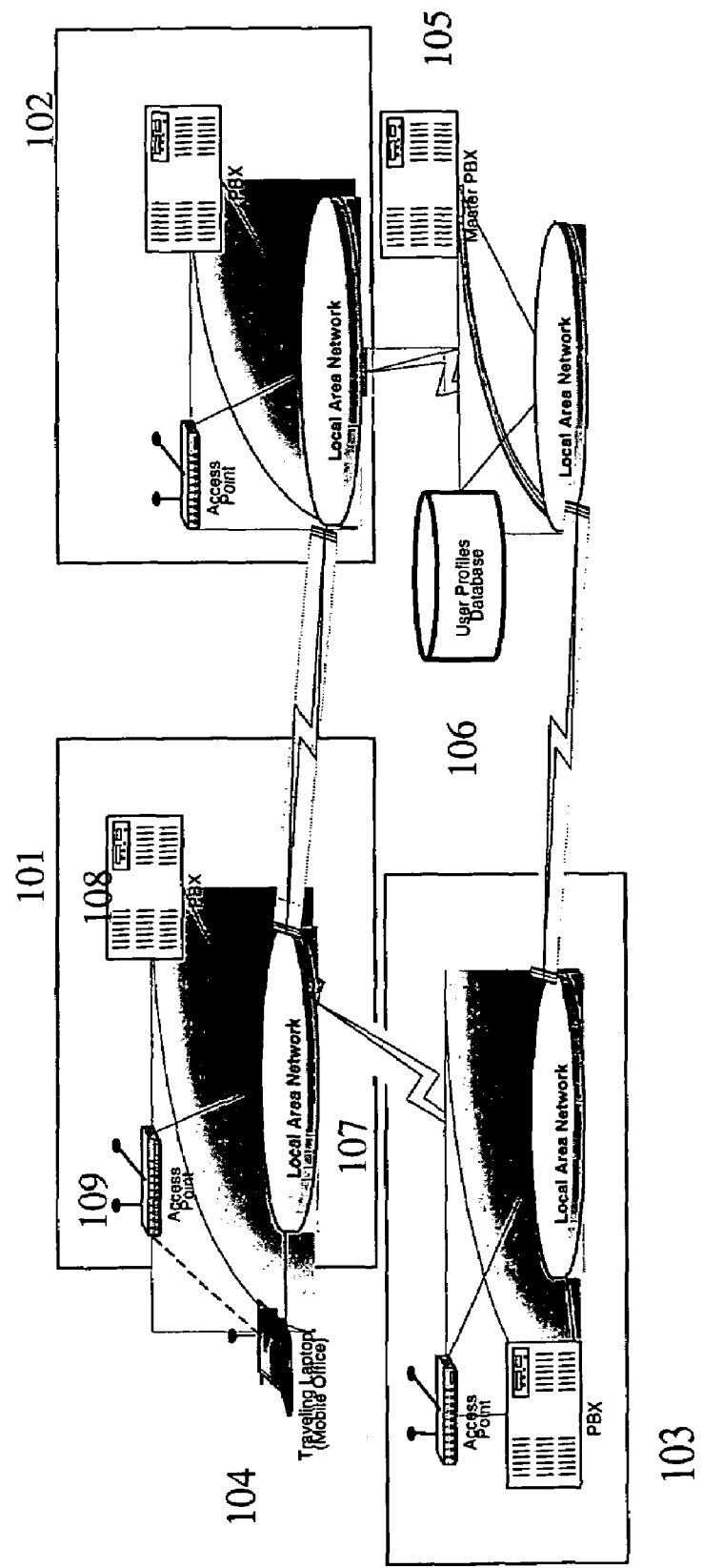
FIG. 1 illustrates a block diagram of a communication system in accordance with a preferred embodiment of the present invention.

FIG. 1 illustrates a block diagram of a communication system 100 in accordance with a preferred embodiment of the present invention. The communication system 100 generally includes first 101, second 102 and third 103 local communication systems, a mobile communication device (MCD) 104, a master private branch exchange (PBX) 105, and a database 106. Each of the first 101, second 102 and third 103 local communication systems includes a local area network 107, a PBX 108, and one or more access points 109.

Preferably, the communication system 100 is intended for use by a healthcare provider that is responsible for monitoring the health and/or welfare of people in its care. Examples of healthcare providers include, without limitation, a hospital, a nursing home, an assisted living care arrangement, a home health care arrangement, a hospice arrangement, a health care clinic, a physical therapy clinic, a chiropractic clinic, a doctor's office, and a dental office. In the preferred embodiment of the present invention, the healthcare provider is a hospital. Examples of employees or contractors of the healthcare provider include, without limitation, a physician, a nurse, a healthcare technician, an administrative worker, executives, information system personnel, social workers, sales personnel, compliance officers, and quality assurance managers. Examples of the people being serviced by the healthcare provider include, without limitation, a patient, a resident, and a client. Hence, the communication system 100 preferably represents an integrated healthcare network.

The first 101, second 102 and third 103 local communication systems are electrically coupled to each other and electrically coupled to the master PBX 105 and the database 106 using communication links that are well known to those skilled in the art of communication systems. The first 101, second 102 and third 103 local communication systems service the communications in first, second and third geographic areas, respectively. Preferably, the first 101, second 102 and third 103 local communication systems represent healthcare information systems supporting the health and/or welfare of people in the care of the healthcare provider. Examples of the healthcare information systems include, without limitation, a records system, a nurse's station system, a pharmacy system, a lab system, a radiology system, an accounting system, and a billing system.

The master PBX 105 coordinates the operations of the individual PBXs in each of the first 101, second 102 and third 103 local communication systems, in a manner well known to those skilled in the art of PBX communication systems. The master PBX 105 and the individual PBXs may be separate or integral, as shown in FIG. 1, depending on various engineering factors.

The database 106 stores user profiles including, without limitation, bibliographic information, personal phone numbers, security information, registration information, personal identification numbers (PIN), auditing information, incoming and outgoing call information, and the like, in a manner well known to those skilled in the art of database storage devices. Preferably, the database 106 associates a user associated identification code with the user's telephone number and the user's physical address. Preferably, the user's telephone number is the user's primary work telephone number. Preferably, the user's physical address is one or more of a zip code and another geographic location identifier, such as a room number, a department number, a street address, and the like.

The MCD 104 is a mobile device that is permitted to move or roam about the first 101, second 102 and third 103 local communication systems. Preferably, the first 101, second 102 and third 103 local communication systems are located at different locations, such as in different parts of the same facility or in different facilities. The facilities may be different buildings on the same campus or located remote from one another.

In each of the first 101, second 102 and third 103 local communication systems includes the local area network 107, the PBX 108, and the access point 109 are individually constructed and electrically coupled to one another, in a manner well known to those skilled in the art of communication systems. The access point 109 represents base stations constructed using wireless technology including, without limitation, cordless telephone, Bluetooth®, Infrared Data Association (IrDA), HomeRF, otherwise known as Shared Wireless Access Protocol (SWAP), and Wireless Ethernet Capability Alliance (WECA), otherwise known as wireless fidelity (WI-FI). These wireless technologies are advantageous in a hospital type environment where restrictions are often placed on use of cell phones because of potential electromagnetic interference with electronic hospital devices and systems.

Figure 2:
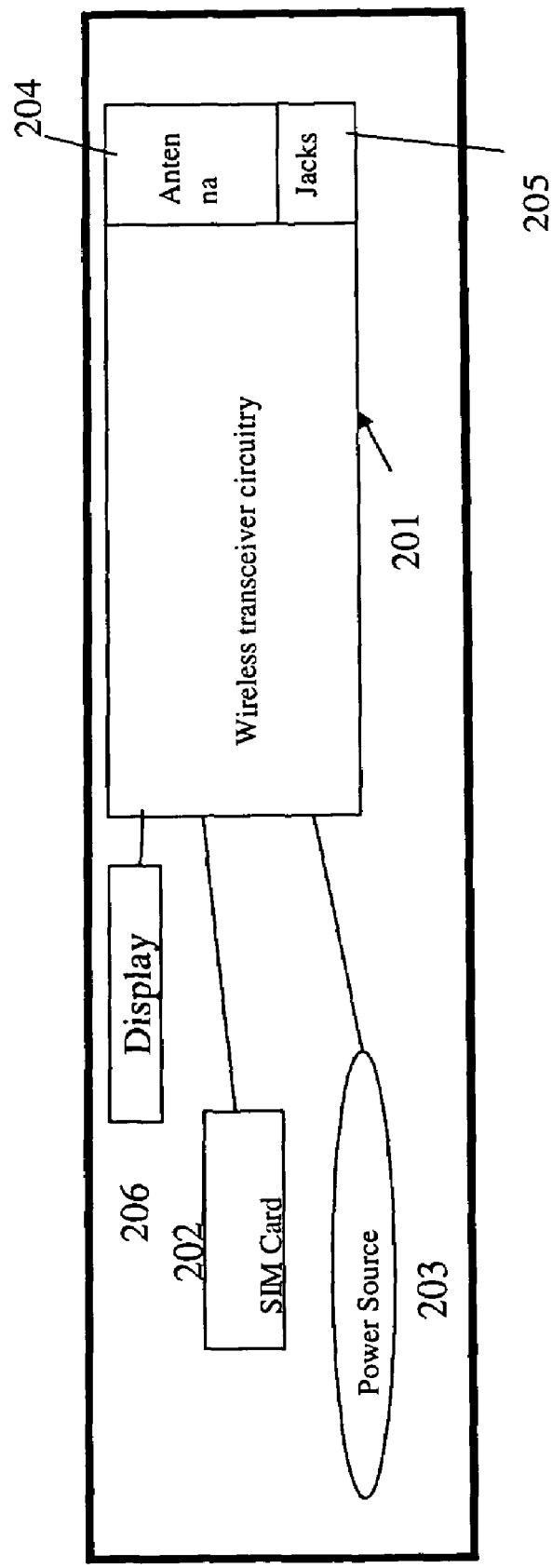
FIG. 2 illustrates a block diagram of a mobile communication device, as shown in FIG. 1, in accordance with a preferred embodiment of the present invention.

FIG. 2 illustrates a block diagram of the MCD 104, as shown in FIG. 1, in accordance with a preferred embodiment of the present invention. The MCD 104 generally includes wireless transceiver circuitry 201, a SIM card 202, a power source 203, and a display 206. The wireless transceiver circuitry 201 further includes an antenna 204 and a jack 205. The MCD 104 may be any type of mobile communication and/or computer device including, without limitation, a laptop computer, a cordless telephone, a telephone, a personal digital assistant, and a portable processing device. Preferably, the MCD 104 is a laptop computer accessing healthcare specific software and adapted for use by healthcare workers for a healthcare provider. Hence, the MCD 104 may have other components and circuitry, such as an input device like a keyboard, a mouse, a voice recognition device, and/or a touch screen, that are not shown, but are well known to those skilled in the art of computing or communication devices.

The wireless transceiver circuitry 201 permits the MCD 104 to wirelessly communicate with the access point 109, in a manner well known to those skilled in the art. The wireless transceiver circuitry 201 is constructed using wireless technology including, without limitation, cordless telephone, Bluetooth®, Infrared Data Association (IrDA), HomeRF, otherwise known as Shared Wireless Access Protocol (SWAP), and Wireless Ethernet Capability Alliance (WECA), otherwise known as wireless fidelity (WI-FI), that is compatible with the wireless technology implemented in the access point 109.

The antenna 204 is electrically coupled to and compatible with the wireless transceiver circuitry 201, and is adapted to transmit and/or receive wireless signals. Preferably, the antenna 204 is integrated with the wireless transceiver circuitry 201 as a single unit.

The jack 205 is electrically coupled to the wireless transceiver circuitry 201, and is adapted to permit a user to connect external devices, such as an earphone and a microphone, to the wireless transceiver circuitry 201. The external device having the earphone and the microphone may take the form of a hands-free headset, or a handset. Alternatively, the user may use an earphone and a microphone that are integrated into the MCD 104. Preferably, the jack 205 is integrated with the wireless transceiver circuitry 201 as a single unit.

Preferably, the wireless transceiver circuitry 201, the antenna 204, and the jack 205 are built into an ISA, PCI or PCMCIA card for connection to the MCD 104, but may be integral to the MCD 104, if desired.

The SIM card 202 is electrically coupled to the wireless transceiver circuitry 201, and is adapted to store user specific information. Such user specific information includes, without limitation, bibliographic information, personal phone number, security information, registration information, phone and address directory, speed dial phone numbers, lock code, and the like, in a manner well known to those skilled in the art of database storage devices. The SIM card 202 is easily attached to and removed from the MCD 104 to permit the user to personally customize and identify the MCD 104. The information stored on the SIM card 202 may be easily updated, if desired from the MCD 104 or another device.

The power source 203 supplies power to the wireless transceiver circuitry 201 and/or the other components of the MCD. The power source 203 may be a portable power supply, such as a direct current (DC) battery, or a fixed power supply, such as an alternating current (AC) line electrically coupled to an AC to DC converter.

The display 206 is electrically coupled to the wireless transceiver circuitry 201 and/or the other components of the MCD 104. The display 206 is adapted to visually display output information to the user. The display 206 may have any size and be constructed of any type of display technology. Preferably, the display 206 is a flat panel screen suitable for use with a laptop computer.

Figure 3:
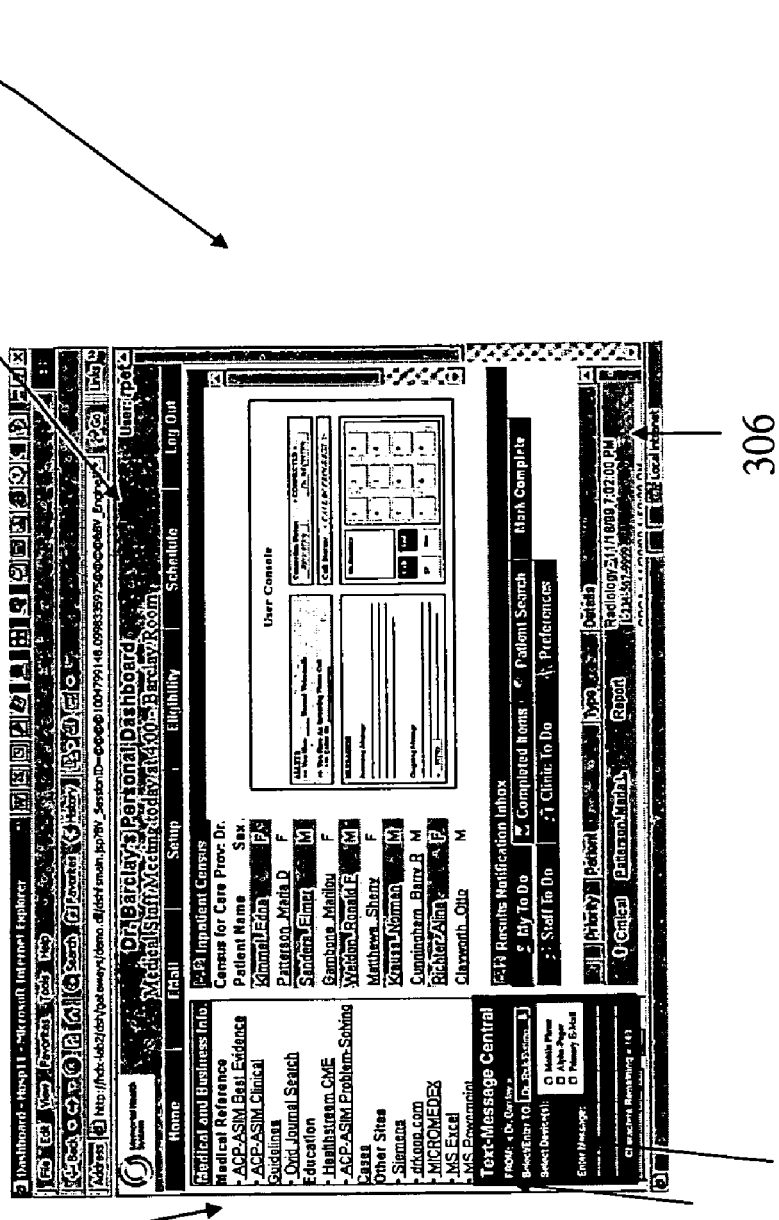
FIG. 3 illustrates a graphical user interface for the mobile communication device, as shown in FIG. 2, in accordance with a preferred embodiment of the present invention.

FIG. 3 illustrates a graphical user interface 300 for the MCD 104, as shown in FIG. 2, in accordance with a preferred embodiment of the present invention. The user interface 300 is visually presented to the user using the display 206, shown in FIG. 2. Preferably, the user interface 300 is visually presented to the user in a browser format, as is well known to those skilled in the art of user interface designs, but may have any type of visual design presentation, if desired. In addition to standard browser controls and formats, the user interface 300 generally includes a header area 301, a census list 302, a user console 303, a results notification box 304, and patient related information 305. Preferably, the user interface 300 is for a healthcare specific software program, such as Soarian® or Health Enterprise Dashboard products, each provided by Siemens Corporation.

The header area 301 preferably display's the user's name, for example, "Dr. Barclay's Personal Dashboard," and important notices, for example, "Medical Staff Meeting today at 4:00—Barclay Room."

The census list 302 provides a list of patients that are under the care and/or supervision of the healthcare worker, in this case Dr. Barclay. Preferably, the list includes the patient's name and sex, but may include any patient related information. The census list 302 permits the healthcare worker to efficiently access patient information related to the healthcare worker's patients.

Figure 4:
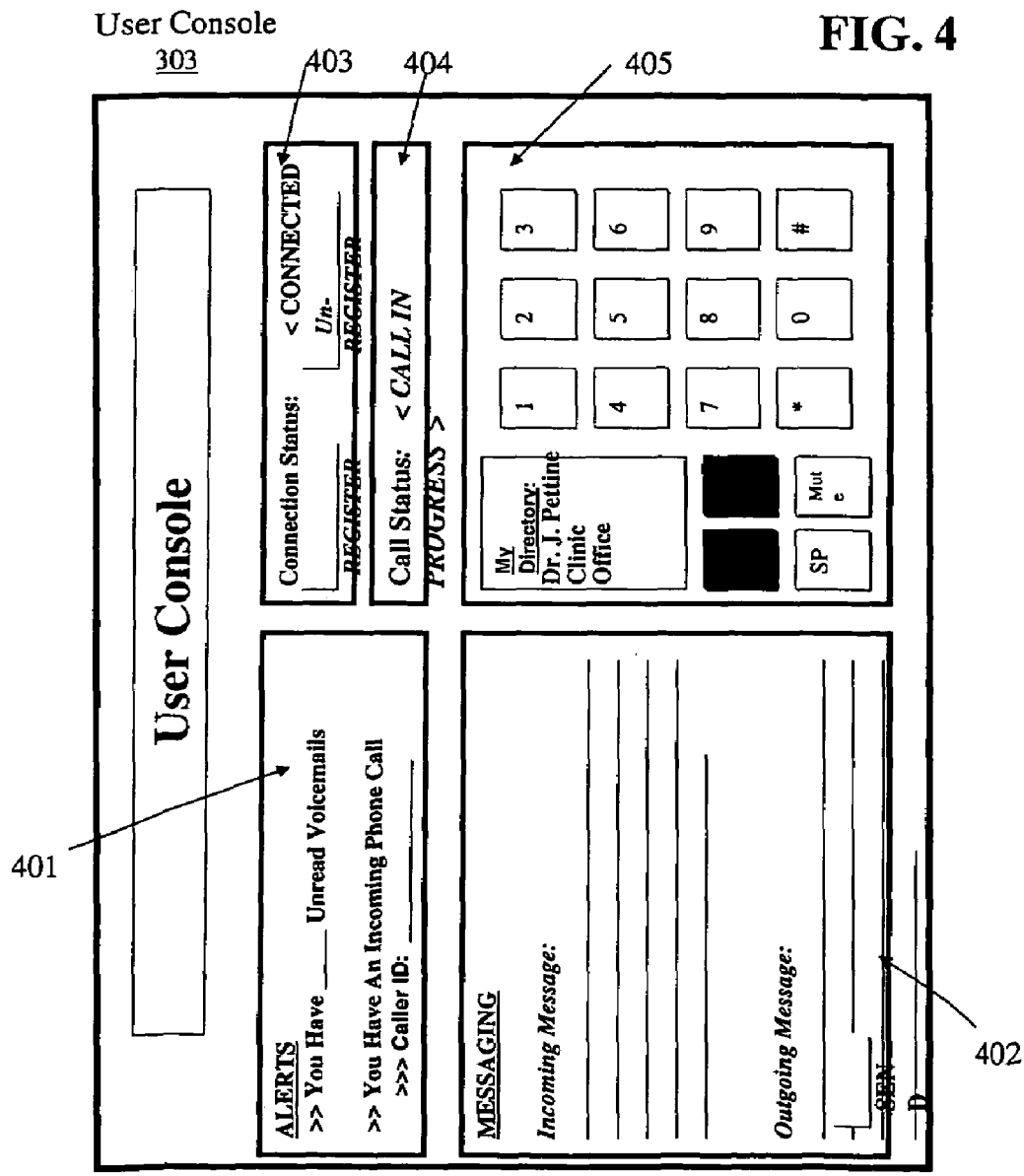
FIG. 4 illustrates a user console for the graphical user interface, as shown in FIG. 3, in accordance with a preferred embodiment of the present invention.

The user console 303 provides a communication interface for the user to manage communications between the MCD 104 and the access point 109. FIG. 4 describes the user console 303 in more detail. The user console 302 can be run as a separate program, or can be embedded into other software programs, such as Microsoft Exchange®, Microsoft Outlook®, Microsoft Word®, etc. Preferably, the user console 303 is integrated into healthcare specific software, as shown in FIG. 3, to permit healthcare workers to engage in integrated, context sensitive, communications and workflow related to patient information, such as critical lab results, patient medication history, order entry, medical images, etc., that the worker has access to anywhere, at anytime, via the healthcare software application. Using one device, the healthcare worker is able to view and take action on the patient information presented via dashboard or Soarian product, while seamlessly communicating with the appropriate parties, such as office staff, lab, X-ray, physicians, or the patient.

The results notification box 304 provides the user with information responsive to selecting one of the boxes labeled "My To Do," "Staff To Do," "Completed Items," "Clinic To Do," "Patient Search," "Preferences," and "Mark Complete." For example, the results notification box 304 provides the user with the patient related information 305. The patient related information 305 includes a priority status, a patient name, a report type, and details titles with corresponding information displayed in a column under each title.

A voice prompt icon or "hyperlink" 306 is generated for those participating applications with corresponding data field values that qualify as valid phone numbers. This feature works similarly to the way Microsoft Office automatically formats Internet URLs when the proper data format is presented, such as www.siemensmedical.com. For example, for domestic (U.S.) dialing, the phone number will be converted to a voice prompt or hyperlink when a numeric value is entered in the format #-###-###-####, such as 1-234-567-9999. When selected with a mouse click or otherwise, this hyperlink will auto-populate the number-to-dial field in the MCD 104 to initiate a call.

FIG. 4 illustrates the user console 303 for the graphical user interface 300, as shown in FIG. 3, in accordance with a preferred embodiment of the present invention. The user console 303 generally includes an alert box 401, a message box 402, a connection box 403, a call status box 404, and a call dialing box 405. The user console 303 may have any layout, design, or style. The user console 303 contains functions and information related to the communications to and/or from the MCD. The communications to and/or from the MCD may be wired or wireless communications, but are preferably wireless communications.

The alert box 401 visually alerts the user to an incoming communication. The alert box 401 permits the user to be notified, preferably via a pop up window, of certain events without having the user console 303 running in an active window of another program. The incoming communication may be happening in the present or may have happened in the past. For the incoming communication that has happened in the past, the alert box 401 displays an indication of those incoming communications, such as for example, by the number of unread voicemails, as shown in FIG. 4. For the incoming communication that is happening in the present, the alert box 401 displays an indication of that incoming communication, such as for example, by the identification of the caller's name and/or phone number, as shown in FIG. 4, out of range warnings, an incoming instant message or a SMS message, and the like. Other non-visual alerts, such as a ringer, buzzer, and vibrator, preferably integrated into the MCD 104, may also be used to alert the user to an incoming call.

The message box 402 visually presents to the user an incoming message, an outgoing message, and a "send" box. Preferably, the incoming message and the outgoing message are presented in a text format. The message box 402 displays the incoming message sent by another user from remote device to the MCD 104. The message box 402 displays the outgoing message to be sent by the user from the MCD 104 to a remote device. The user selects the send box to send or transmit the outgoing message. Hence, the message box 402, using a text format, is analogous to an electronic mail (email) function.

The connection box 403 provides the user with a status of the present communication connection, such as "connected," or "unconnected" to provide the user with positive feedback about the status of the connection. The connection box 403 also includes a "register" box and an "un-register" box. The MCD 104 registers with the local communication system 101 via the access point 109 responsive to the user selecting the register box, as described in further detail in FIG. 6. The MCD 104 un-registers with the local communication system 101 responsive to the user selecting the un-register box, as described in further detail in step 507 of FIG. 5.

The call status box 404 provides the user with a status of the present call, such as "call in progress" to provide the user with positive feedback about the status of the call.

The call dialing box 405 provides the user with a mechanism to generate numeric and/or alpha characters, such as a personal identification number (PIN) during the registration process and phone numbers to initiate an outgoing call after the MCD 104 registers with the local communication system 101. The call dialing box 405 includes a conventional telephone keypad including keys 0-9, *, and # to permit the user to manually dial a phone number by selecting an appropriate sequence of keys. The user may select the keys in any manner, such as by moving a cursor over the keys and clicking a mouse button, by directly touching a touch screen input overlaying the keys, or by touching keys on a keyboard. The call dialing box 405 also includes a "call" key to manually initiate the sending or transmitting the sequence of selected keys, an "end" key to manually end the call, a "mute" key to mute the call, and a "speed dial" (SP) key to call numbers from the directory by pressing one key. The call dialing box 405 also includes a directory listing that permits the user to select a healthcare resource, otherwise called a user interface image item, or an icon representing the same that corresponds to a pre-stored phone number. For example, the healthcare resource may be a patient's name, a physician's name, a department's name, a specialists name, a laboratory, a pharmacy name, an X-ray, electrocardiogram (ECG), or imaging related name, a hospital's name, the phone number itself, medical information associated with a patient, laboratory test results for a patient, an order for a procedure to be performed that is associated with a particular patient, any other test results for a patient, and the like. Upon selection of the healthcare resource or an icon 306 representing the same, the MCD 104 automatically generates, otherwise called pre-populates, and automatically transmits the corresponding phone number. The auto-population feature may be either session-oriented (e.g., until the user logs off), or permanently entered in the users directory stored on the SIM card 202.

The user console 303 may also have areas or open new windows that permit the user to view video, pictures, photos, films, and the like. Like the voice or text communications, the video, pictures, photos, films, and the like may be transmitted in an outgoing message or received in an incoming message. Generally, information that is sent may be the same as the information that is received.

Hence, the user console 303 permits a user to perform various communication tasks including, without limitation, registering the phone to the local site's network, authenticating to the network, checking voicemail, receiving voicemail alerts, and placing and answering calls.

Figure 5:
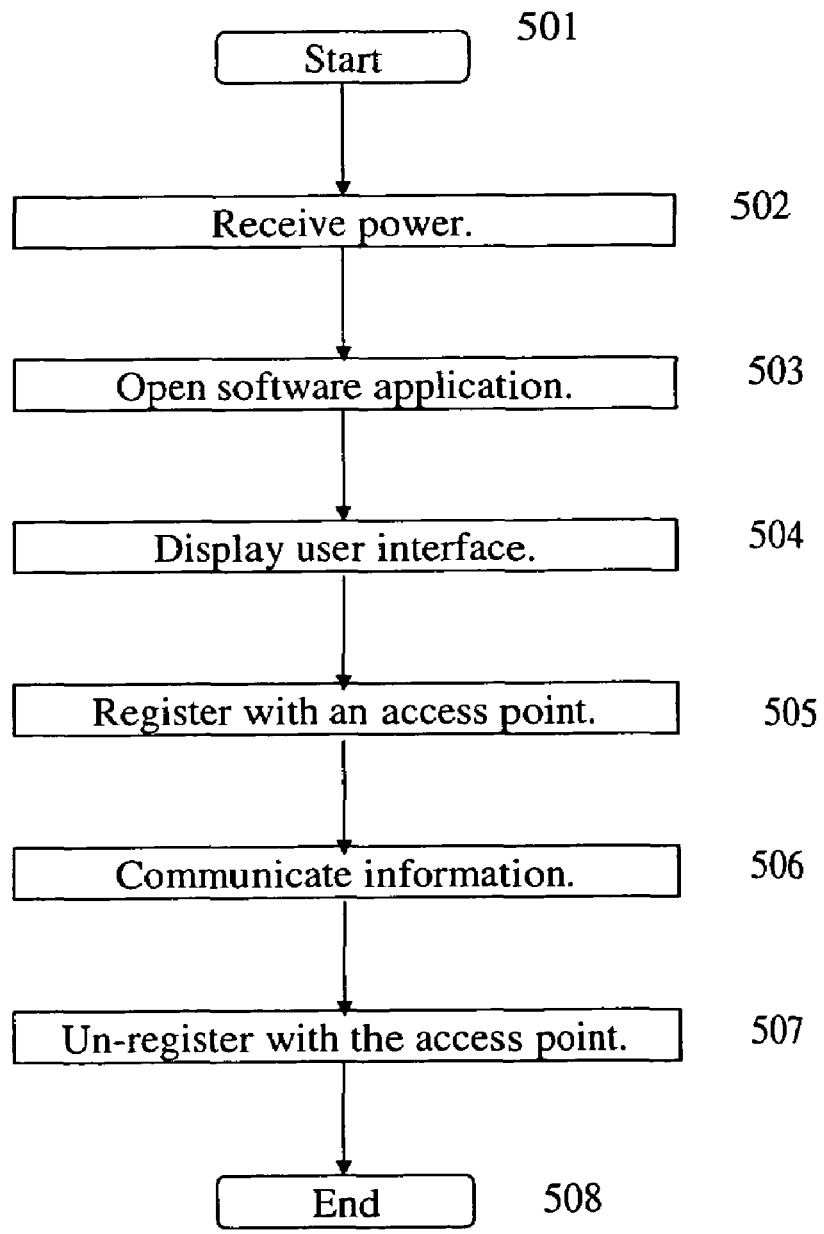
FIG. 5 illustrates a method for operating the mobile communication device, as shown in FIG. 2, in accordance with a preferred embodiment of the present invention.

FIG. 5 illustrates a method 500 for operating the MCD 104, as shown in FIG. 2, in accordance with a preferred embodiment of the present invention.

At step 501, the method starts.

At step 502, the MCD 104 receives power from the power source 203 responsive to the user turning on a power switch on the MCD 104.

At step 503, the MCD 104 opens a software application responsive to the user manually selecting the software application. Alternatively, the software application may also open automatically, if so desired, such as when it is a frequency used application. Preferably, the software application is specific to the healthcare field, such as shown in FIG. 3.

At step 504, the MCD 104 displays, as shown in FIG. 3, the graphical user interface 300 associated with the software application on the display 206, as shown in FIG. 2.

Figure 6:
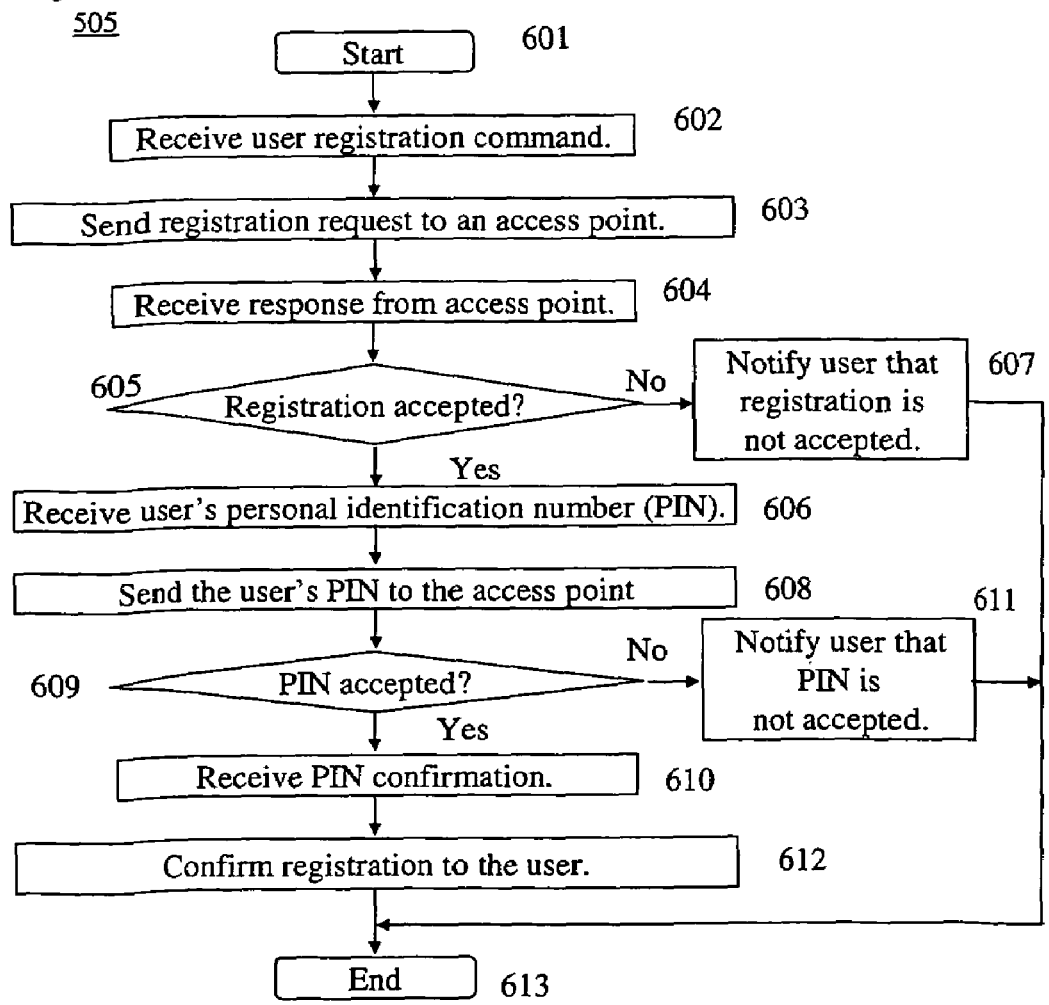
FIG. 6 illustrates a method for registering the mobile communication device, as shown in FIG. 2, as a part of the method for operating, as shown in FIG. 5, in accordance with a preferred embodiment of the present invention.

At step 505, the MCD 104 registers with the local communication system 101 via the access point 109, as described in further detail in FIG. 6.

Figure 7:
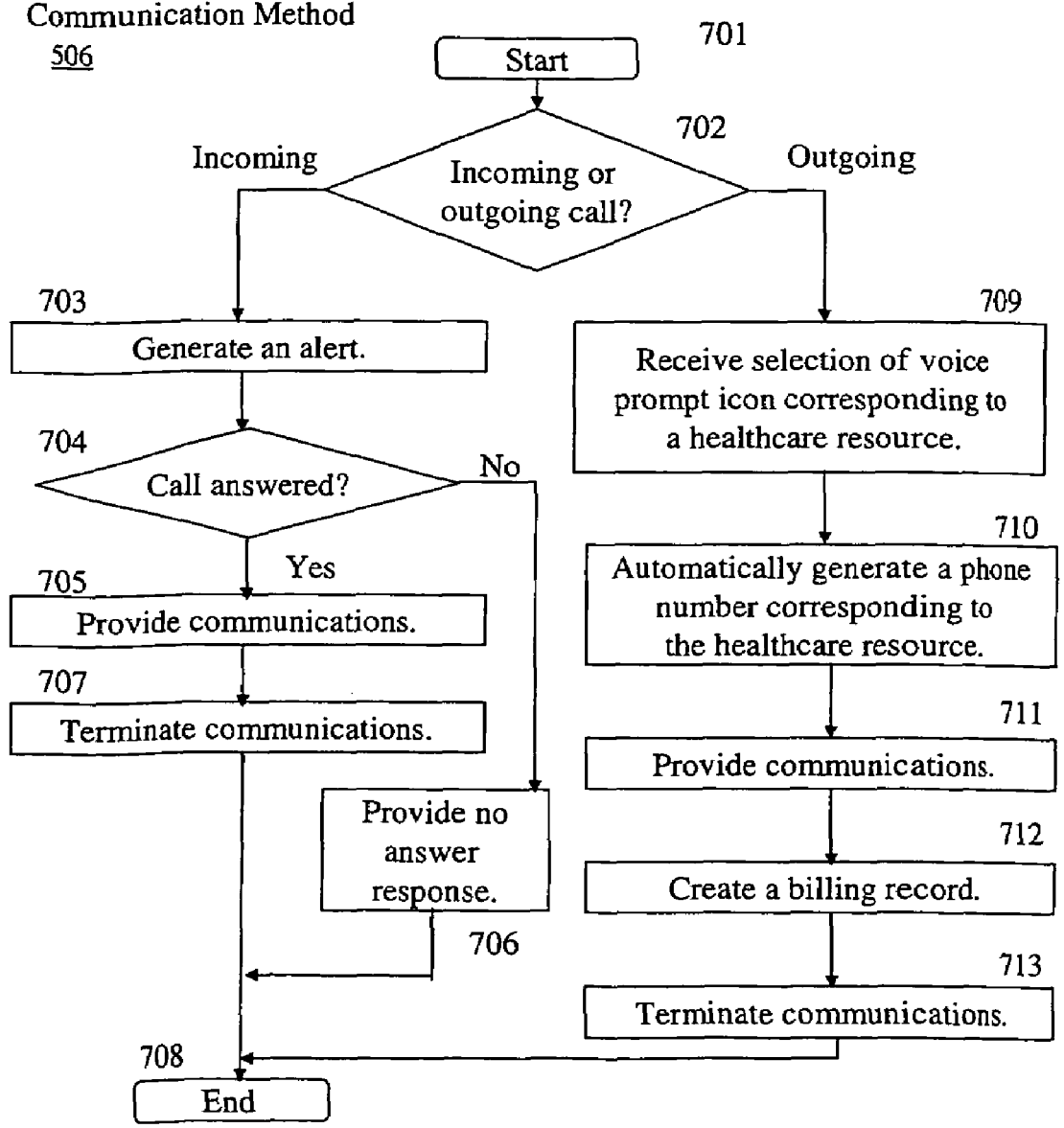
FIG. 7 illustrates a method for communicating by the mobile communication device, as shown in FIG. 2, as a part of the method for operating, as shown in FIG. 5, in accordance with a preferred embodiment of the present invention.

At step 506, the MCD 104 communicates information with the local communication system 101 via the access point 109, as described in further detail in FIG. 7. The information communicated may be of any type including, without limitation, audible, visual, and/or non-audible and non-visual computer data.

At step 507, the MCD 104 un-registers with the local communication system 101 via the access point 109. The MCD 104 un-registers, for example, responsive to the user manually selecting the un-register box in the connection box 403, the user powering off the MCD 104, and/or by the user moving the MCD 104 out of range of the access point 109.

At step 508, the method ends.

FIG. 6 illustrates a method for registering 505 the MCD 104, as shown in FIG. 2, as a part of the method for operating 500, as shown in FIG. 5, in accordance with a preferred embodiment of the present invention.

At step 601, the method starts.

At step 602, the MCD 104 receives a registration command from the user, such as for example, by the user selecting the register box in the connection box 403, generating a voice command, and the like.

At step 603, the MCD 104 sends the registration request to the local communication system 101 via the access point 109, in a manner well known to those skilled in the art of wireless communications. The registration request includes security information and a user associated identification code, such as a phone number, a user identifier, an account number, a user specific code, and an Internet protocol (IP) address.

At step 604, the MCD 104 receives a response from the access point 109.

At step 605, the MCD 104 determines whether the registration request was accepted by the local communication system 101, in a manner well known to those skilled in the art of wireless communications. Preferably, the registration request is checked against corresponding information stored in the database 106. If the registration request was accepted by the local communication system 101, then the method continues to step 606; otherwise, the method continues to step 607.

At step 606, the MCD 104 receives the user's personal security identification, such as a identification number (PIN) for security purposes. Preferably, the user enters the PIN via the keypad in the user console 303 using a mouse cursor.

At step 607, the MCD 104 notifies the user that the user's registration is not accepted by the local communication system 101, such as for example, by displaying "registration denied" in the connection box 403. After step 607, the method 505 continues to step 613. Alternatively, after being denied registration, the user may be permitted to try to register again with the same or new site, within a predetermined amount of time, before continuing to step 613. In this case, after step 607, the method 505 returns to step 602.

At step 608, the MCD 104 sends the user's PIN to the local communication system 101 via the access point 109, in a manner well known to those skilled in the art of wireless communications.

At step 609, the MCD 104 determines whether the user's PIN was accepted by the local communication system 101, in a manner well known to those skilled in the art of wireless communications. Preferably, the PIN is checked against corresponding information stored in the database 106. If the user's PIN was accepted by the local communication system 101, then the method continues to step 610; otherwise, the method continues to step 611.

At step 610, the MCD 104 receives confirmation that the PIN was accepted, such as for example, by displaying "PIN accepted" in the connection box 403.

At step 611, the MCD 104 notifies the user that the user's PIN is not accepted by the local communication system 101, such as for example, by displaying "PIN denied" in the connection box 403. After step 611, the method continues to step 613. Alternatively, after the PIN is denied, the user may be permitted to enter the PIN again, such as for a predetermined number of entries or a predetermined amount of time before continuing to step 613. In this case, after step 611, the method 505 returns to step 606.

At step 612, the MCD 104 confirms the registration to the user, such as for example, by displaying "registration accepted" in the connection box 403. Hence, the MCD 104 is registered for the local communication system 101.

At step 613, the method ends.

FIG. 7 illustrates a method for communicating 506 by the MCD 104, as shown in FIG. 2, as a part of the method for operating 500, as shown in FIG. 5, in accordance with a preferred embodiment of the present invention.

At step 701, the method starts.

At step 702, the MCD 104 determines whether the communication is an incoming call or an outgoing call, in a manner well known to those skilled in the art of wireless LAN communications. If the communication is an incoming call, then the method continues to step 703; otherwise, the method continues to step 709.

At step 703, the MCD 104 generates an alert to alert the user to an incoming call, as described above with the alert box 401 shown in FIG. 4.

At step 704, the MCD 104 determines whether the incoming call is answered by the user, in a manner well known to those skilled in the art of wireless communications. If the communication is incoming call is answered by the user, then the method continues to step 705; otherwise, the method continues to step 706.

At step 705, the MCD 104 provides communications between the user and a remote party or device, via the MCD 104 and the access point 109.

At step 706, the MCD 104 provides a "no answer" response, such as for example, by taking a message by voice mail, as described with the alert box 401 in FIG. 4.

At step 707, the MCD 104 terminates communications when the user or the remote party or remote device ends the communication, such as for example, by the user selecting the end key in the call dialing box 405, as shown in FIG. 4, or by powering down the MCD 104. After step 707, the method continues to step 708.

At step 709, the MCD 104 receives the user's input for a phone number to initiate an outgoing call. For example, the user's input may be the user's selection of a voice prompt icon or hyperlink 306 corresponding to a phone number for a healthcare resource, by the user's dialing the appropriate sequence of keys, by the user selecting an item from the directory having a corresponding phone number, and the like, as described with reference to FIG. 4.

At step 710, the MCD 104 automatically generates or populates the phone number.

At step 711, the MCD 104 provides communications between the user and a remote party or device, via the MCD 104 and the access point 109.

At step 712, the MCD 104 creates a billing record of the incoming and/or outgoing communications between the user and a remote party or device, via the MCD 104 and the access point 109.

At step 713, the MCD 104 terminates communications when the user or the remote party or remote device ends the communication, such as for example, by the user selecting the end key in the call dialing box 405, as shown in FIG. 4, or by powering down the MCD 104. After step 713, the method continues to step 708.

At step 708, the method ends.

FIG. 8 illustrates a method for operating 800 the access point 109, as shown in FIG. 1, in accordance with a preferred embodiment of the present invention. The method 800 generally provides a method for the access point 109, via the first local communication system 101, to direct incoming calls directed to the user's personal phone number to the local communication system where the MCD 104 is presently located. The personal phone number may be the user's home or office phone number. Preferably, the personal phone number is the user's office phone number associated with a healthcare provider.

At step 801, the method starts.

At step 802, the access point 109 receives a request for registration from the MCD 104. Preferably, the request for registration includes a user associated identification code and security information, such as the user's PIN.

At step 803, the access point 109, identifies a first phone number associated with a second remote location. Preferably, the second remote location is a physical address associated with the user associated identification code. Preferably, the first phone number is a primary office phone number and the physical address is the for a healthcare worker's primary office.

At step 804, the access point 109 determines whether the MCD 104 is authorized to receive calls to the first phone number. If the MCD 104 is authorized to receive calls to the first phone number, then the method continues to step 805; otherwise, the method continues to step 806.

At step 805, the access point 109 diverts communications from the first phone number to the MCD 104 at a first location. Preferably, the first location represents the first local communication system 101 that the MCD 104 is presently located in. Hence, the method 800 permits healthcare workers to travel between frequented sites and remain connected for voice and/or data communications, just as if they were in their primary office. When the healthcare worker moves to a local communication system 101, otherwise called a connected partner site, the worker's primary office number moves with him/her without the worker having to carry or borrow telephones that have a different phone number associated with it. The different phone number has limited value to incoming callers and internal auditors. The worker has communication access via one primary phone number and via one mobile device. After the healthcare worker registers with the communication system 100, incoming calls to the worker's personal phone number are routed through the communication system 100 to the local communication network 101 and then to the MCD 104 via a wireless link. Likewise, outgoing calls are routed from the MCD 104 to the local communication system 101 via a wireless link and then through the communication system 100 to the same or different local communication system 101, 102, 103, or to the PSTN. Therefore, the worker makes outgoing and receives incoming calls via a personal phone number while registered with a local communication system 101.

At step 806, the access point 109 provides a not authorized reply to the MCD 104.

At step 807, the access point 109 creates a record of calls diverted from the first phone number to the MCD 104 at the first location. Hence, the record of calls permits the user or a system operator to determine which local communication system the incoming calls were directed to. The access point 109 may also create a record of outgoing calls from the MCD 104 to permit the user or a system operator to determine which local communication system the incoming calls were generated from. Preferably, the record of incoming and/or outgoing calls are stored in the database 106. The calls recorded include, without limitation, one or more of: a time, date and duration of individual calls, the user associated identification code received in the registration method, a source identifier identifying a source of an individual call diverted to the MCD 104, and a destination identifier identifying a destination of an individual call made from the MCD 104.

At step 808, the method ends.

The communication system 100 advantageously permits mobile healthcare workers to efficiently communication using the MCD 104 having healthcare specific software when moving among different local communication systems in a healthcare enterprise. The communication system 100 provides duplex wireless voice and/or data communications via an integrated productivity hardware (i.e., the MCD 104) and software tool, represented in FIGS. 3 and 4, for healthcare workers traveling among various healthcare provider sites, while appearing and functioning as if they were in their primary office.

Hence, while the present invention has been described with reference to various illustrative embodiments thereof, the present invention is not intended that the invention be limited to these specific embodiments. Those skilled in the art will recognize that variations, modifications and combinations of the disclosed subject matter can be made without departing from the spirit and scope of the invention as set forth in the appended claims. For example, although the preferred embodiment is in the healthcare field, the communication system 100 and aspects thereof may be applied to any industry that employs mobile workers that must travel between branch offices, factories, warehouses, or other company-related and geographically dispersed sites. Further, the methods and user interfaces presented may have any desirable and appropriate order and design.

What is claimed is:

1. A method supporting communication using a mobile communication device employing a single user associated identification code in different relatively remote locations, comprising the steps of:

at a first remote location, communicating at least one registration message to an access system from a mobile communication device using a wireless communication mode, in response to a user registration command via a displayed user interface image, said at least one registration message, including a user associated identification code and security information and being suitable for enabling said access system to identify said user and to divert voice communication from a first telephone number linked with a physical address of a second remote location associated with said user associated identification code to said mobile communication device at said first remote location user a selected communication system of a plurality of different communication systems;

automatically establishing communication using said selected communication system with a healthcare data source to acquire healthcare data of a patient using a phone number derived from a repository associating healthcare resources and predetermined phone numbers, in response to user selection of an image item in a user interface; and receiving a response message indicating status of said
diversion of voice communication from said first telephone number linked with said physical address of said second remote location to said mobile communication device at said first remote location.

2. A method according to claim 1, wherein
said at least one registration message includes an IP address and
said step of automatically establishing communication uses said IP address in establishing non-cell hone communication and
said user associated identification code comprises at least one of, (a) a telephone number, (b) a user identifier, (c) an account number, and (d) a user specific code.

3. A method according to claim 1, wherein
said plurality of different communication systems are employed within a single healthcare facility and
said mobile communication device comprises at least one of, (a) a laptop computer, (b) cordless telephone, (c) telephone and (d) personal digital assistant and (e) a portable processing device.

4. A method according to claim 1, wherein
said access system incorporates a database associating a user associated identification code with a telephone number and physical address associated with said second remote location enabling,
(a) said access system to initiate diversion of voice communication telephone calls, made to said first telephone number linked with said physical address of said second remote location associated with said user associated identification code, to said mobile communication device at said first remote location and
(b) creation of a record of calls made by said user from said mobile communication device at said first remote location, said record being used in automatically billing for said calls to a billing account associated with said first telephone number.

5. A method according to claim 1, including the step of
generating a voice prompt icon associated with a displayed user interface image item identifying at least one of, (a) medical information associated with a particular patient, (b) laboratory test results for a particular patient, (c) an order for a particular procedure to be performed associated with a particular patient and (d) other test results for a particular patient, and
initiating voice communication to a pre-populated second telephone number associated with said displayed user interface image item, in response to user selection of said voice prompt icon.

6. A method according to claim 1, wherein
said voice communication also comprises data communication and said user is a healthcare worker and including the step of
receiving data comprising at least one of, (a) medical information associated with a particular patient, (b) laboratory test results for a particular patient, (c) an order for a particular procedure to be performed associated with a particular patient and (d) other test results for a particular patient, said data being diverted from said first telephone number linked with said physical address of said second remote location to said mobile communication device at said first remote location.

7. A method according to claim 6, wherein
said healthcare worker comprises at least one of, (a) a physician, (b) a nurse, (c) a healthcare technician and (d) an administrative worker.

8. A method according to claim 6, including the step of:
generating a voice prompt icon, associated with a displayed user interface image item identifying said data, enabling said healthcare worker to initiate voice communication to a pre-populated second telephone number associated with said displayed user interface image item, in response to user selection of said voice prompt icon and
creating a billing record for use in billing for said initiated voice communication call made by said healthcare worker from said mobile communication device at said first remote location to an account associated with said first telephone number.

9. A method according to claim 8, including the step of:
automatically pre-populating telephone numbers associated with a particular patient including at least one of, (a) a referring physician telephone number, (b) a patient telephone number, (c) a specialist telephone number, (d) a laboratory telephone number, (e) a pharmacy telephone number and (f) an x-ray or ECG or Imaging related telephone number.

10. A method according to claim 1, wherein
said access system associates said first telephone number with a physical address including at least one of, (a) a zip code and (b) another geographic location identifier and
said status indicates at least one of, (i) successful completion of diversion, (b) diversion is being implemented and (c) failure of said diversion.

11. A method according to claim 1, including the step of
said first telephone number linked with said physical address of said second remote location associated with said user associated identification code is an Internet compatible address supporting Internet communication.

12. A method according to claim 1, wherein said step of
creating a record of calls comprises recording at least one of, (a) said user associated identification code received in said registration message (b) a source identifier identifying a source of an individual call diverted to said mobile communication device, and (d) a destination identifier identifying a destination of an individual call made from said mobile communication device.

13. A method for use in supporting communication using a mobile communication device employing a single user associated identification code in different relatively remote locations, comprising the steps of:
receiving at least one registration message from a mobile communication device using a wireless communication mode, said at least one registration message, including a user associated identification code, an IP address and security information;
identifying a first telephone number linked with a physical address of a second remote location associated with said user associated identification code;
determining said mobile communication device is authorized to receive calls directed to said first telephone number using said received security information;
diverting voice communication from said first telephone number to said mobile communication device at said first remote location in response to said authorization;
automatically establishing communication using a selected communication system of a plurality of different communication systems with a healthcare data source to acquire healthcare data of a patient using said IP address and a phone number derived from a repository associating healthcare resources and predetermined phone numbers, in response to user selection of an image item in a user interface; and creating a record of calls diverted from said first telephone number to said mobile communication device at said first remote location.

14. A communication system for a healthcare provider comprising:
a first local communication system having at least one first access point and providing wireless communication services to a first geographic area;
a second local communication system having at least one second access point and providing wireless communication services to second geographic area;
a database electrically coupled to the first local communication system and the second local communication system and adapted to store user specific information;
a controller electrically coupled to the first local communication system and the second local communication system, and adapted to control communications for the first local communication system and the second local communication system;
a mobile communication device adapted to move between the first geographic area and the second geographic area, and adapted to wirelessly communicate with one of the first access point and the second access point when located in the first geographic area and the second geographic area, respectively, responsive to the user specific information including an IP address, wherein the mobile communication device includes a software application for automatically establishing communication using a selected communication system with a healthcare data source to acquire healthcare data of a patient using said IP address and a phone number derived from a repository associating healthcare resources and predetermined phone numbers in response to user selection of an image item in a user interface.

15. A communication system according to claim 14, wherein the user specific information further comprises at least one of:
a telephone number, a user identifier, and an account number.

16. A communication system according to claim 14, wherein the software application further comprises:
a phone number generator adapted to automatically generate a phone number associated with the information related to the patient.

17. A communication system according to claim 16 wherein mobile communication device further comprises:
a display adapted to present said image item.

18. A mobile communication device, comprising:
a wireless transceiver adapted to wirelessly communicate with one of a first access point, associated with a first local communication system in a first geographic area, and a second access point, associated with a second local communication system in a second geographic area, when the mobile communication device is located in the first geographic area and the second geographic area, respectively;
a database including information related to patients under the care of the healthcare provider; and
a software application providing communication functions for automatically establishing communication, using a selected one of said first and second local communication systems with a healthcare data source to acquire healthcare data of a patient using a phone number derived from a repository associating healthcare resources and predetermined phone numbers, in response to user selection of an image item in a user interface.

19. A mobile communication device according to claim 18, wherein the software application further comprises:
a phone number generator adapted to automatically generate said phone number.

20. A mobile communication device according to claim 19 further comprising:
a display adapted to present said image item, wherein said phone number generator automatically generates said phone number responsive to a user of the mobile communication device selecting the icon.

* * * * *